US012153663B2

(12) United States Patent
Cambou et al.

(10) Patent No.: US 12,153,663 B2
(45) Date of Patent: Nov. 26, 2024

(54) PASSWORD MANAGER DATABASE ENCRYPTION AND GENERATION OF TEMPORARY CODE BASED ON ReRAM PHYSICAL UNCLONABLE FUNCTIONS

(71) Applicant: Arizona Board of Regents on Behalf of Northern Arizona University, Flagstaff, AZ (US)

(72) Inventors: Bertrand F. Cambou, Flagstaff, AZ (US); Sareh Assiri, Flagstaff, AZ (US)

(73) Assignee: ARIZONA BOARD OF REGENTS ON BEHALF OF NORTHERN ARIZONA UNIVERSITY, Flagstaff, AZ (US)

( * ) Notice: Subject to any disclaimer, the term of this patent is extended or adjusted under 35 U.S.C. 154(b) by 224 days.

(21) Appl. No.: 18/084,365

(22) Filed: Dec. 19, 2022

(65) Prior Publication Data
US 2023/0195880 A1    Jun. 22, 2023

Related U.S. Application Data

(60) Provisional application No. 63/291,201, filed on Dec. 17, 2021.

(51) Int. Cl.
    *G06F 21/00*    (2013.01)
    *G06F 21/46*    (2013.01)
(52) U.S. Cl.
    CPC .................... *G06F 21/46* (2013.01)
(58) Field of Classification Search
    CPC ........................................ G06F 21/46
    See application file for complete search history.

(56) References Cited

U.S. PATENT DOCUMENTS

| 11,010,465 | B2 | 5/2021 | Cambou | |
|---|---|---|---|---|
| 11,477,039 | B2 | 10/2022 | Cambou et al. | |
| 2018/0129801 | A1* | 5/2018 | Cambou | H04L 9/0866 |
| 2018/0131529 | A1 | 5/2018 | Cambou | |

(Continued)

OTHER PUBLICATIONS

S. Assiri et al., "Homomorphic Password Manager Using Multiple-Hash With PUF," in Advances in Information and Communication: Proceedings of the 2021 Future of Information and Communication Conference (FICC), vol. 1, pp. 772-792, 2021.

(Continued)

*Primary Examiner* — Jeffrey C Pwu
*Assistant Examiner* — Thong P Truong
(74) *Attorney, Agent, or Firm* — Quarles & Brady LLP

(57) ABSTRACT

The present invention provides a method for using a tamper-resistant physical unclonable functions (PUF) to generate temporary passwords, encrypt a password manager database for one-way encryption, and authenticate users. Resistive Random-Access Memory (ReRAM) can be exploited as PUFs. On the server side, a ReRAM PUF can be used to change the format of the password manager database. By comparing the resistance values extracted from the ReRAM PUF, a bitstream can be generated which can then be used as a challenge. Furthermore, by utilizing the hash function and the ReRAM PUF, the password manager database's content can be encrypted as a one-way encryption. The resistance values, which are the ReRAM PUF output, are converted to a bitstream and then replace the user ID and password hash in the database.

20 Claims, 11 Drawing Sheets

(56) References Cited

U.S. PATENT DOCUMENTS

2022/0067140 A1 3/2022 Cambou et al.
2022/0197599 A1 6/2022 Cambou et al.

OTHER PUBLICATIONS

B. Cambou et al., "TRNGs from Pre-Formed ReRAM Arrays," Cryptography, vol. 5, No. 8, 2021.
S. Assiri et al., "Software Implementation of a SRAM PUF-Based Password Manager," in Advances in Intelligent Systems and Computing, vol. 1230, pp. 361-379, 2020.
S. Assiri et al., "Key Exchange Using Ternary System to Enhance Security," in 2019 IEEE 9th Annual Computing and Communication Workshop and Conference, pp. 488-492, 2019.
B. Cambou, "Password Manager Combining Hashing Functions and Ternary PUFs," Advances in Intelligent Systems and Computing, 2019.
A. R. Korenda et al., "A Proof of Concept SRAM-based Physically Unclonable Function (PUF) Key Generation Mechanism for IoT Devices," 16th Annual IEEE International Conference on Sensing, Communication, and Networking (SECON), 2019, https://doi.org/10.1109/SAHCN.2019.8824887.
B. Cambou et al., "PUF Designed with Resistive RAM and Ternary States," in Proceedings of the 11th Annual Cyber and Information Security Research Conference, 2016.
D. Wang et al., "Targeted Online Password Guessing: An Underestimated Threat," in Proceedings of the ACM Conference on Computer and Communications Security, vol. 24-28, pp. 1242-1254, 2016.
C. Herder et al., "Physical Unclonable Functions and Applications: A Tutorial," Proceedings of the IEEE, vol. 102, No. 8., pp. 1126-1141, 2014.
A. R. Korenda et al."A Secret Key Generation Scheme for Internet of Things using Ternary-States ReRAM-Based Physical Unclonable Functions," in 2018 14th International Wireless Communications and Mobile Computing Conference, pp. 1261-1266, 2018.
A. Afghah et al., "A ReRAM Physically Unclonable Function (ReRAM PUF)-Based Approach to Enhance Authentication Security in Software Defined Wireless Networks," Int. J. Wirel. Inf. Networks, vol. 25, No. 2, pp. 117-129, 2018.
D. R. Stinson, "A Provably Secure True Random Number Generator with Built-in Tolerance to Active Attacks," IEEE Trans. Comput., vol. 56, No. 1, pp. 109-119, 2007.
C.-S. Tsai et al., "Password Authentication Schemes: Current Status and Key Issues," International Journal of Network Security, 2006.

* cited by examiner

PASSWORD MANAGER DATABASE ENCRYPTION AND GENERATION OF TEMPORARY CODE BASED ON ReRAM PHYSICAL UNCLONABLE FUNCTIONS

CROSS-REFERENCE TO RELATED APPLICATION(S)

This application claims priority to U.S. Provisional Application 63/291,201 entitled "Password Manager Database Encryption and Generation of Temporary Code Based on ReRAM Physical Unclonable Functions" filed on Dec. 17, 2021, the disclosure of which is incorporated in its entirety herein by reference.

STATEMENT CONCERNING FEDERALLY FUNDED RESEARCH

N/A

BACKGROUND OF THE INVENTION

Access to systems, applications, or online accounts needs to be secure, and a password is one way authentication can be used for access. Conventional authentication systems store user authentication information including user identifiers (such as a number or username) and associated authentication credentials (such as passwords) in lookup tables or databases. To improve security, many systems obscure the user identifiers and/or the credentials by encrypting the user information or applying hashing functions to the user information so that a hacker cannot readily determine users' credentials by obtaining unauthorized access to the user authentication information stored by the system. In other conventional systems, a user has no fixed credentials and instead responds to an authentication challenge instructing the user (or user device) to perform mathematical or other operations on information shared by the user and the authentication system but unknown to a potential hacker or other unauthorized third party. Even in such systems, information used to generate the challenge and validate the response must be kept secure.

Thus, it is essential to keep passwords, user IDs, and the database containing such information safe from modification, integration, and unauthorized access. Therefore, it is desirable to keep the password manager database safe from insider and outsider attacks.

To provide a high level of security and mitigate the risks, physical unclonable functions (PUFs) have been suggested as a means for encrypting the password database using one-way encryption. Moreover, PUFs can be used to generate a very random temporary password as the level of randomness in PUFs is inherently high. The use of PUFs for password management and password encryption at a server device is disclosed in U.S. Pat. No. 11,010,465 entitled "PASSWORD MANAGEMENT WITH ADDRESSABLE PHYSICAL UNCLONABLE FUNCTION GENERATORS" and U.S. Published Application No. 2022/0067140 entitled "RESILIENT PASSWORD MANAGEMENT SYSTEM USING AN ARRAY OF ADDRESSABLE PHYSICAL UNCLONABLE FUNCTIONS", both of which are incorporated herein by reference in their entireties for all purposes.

PUF hardware components can function like human fingerprints. PUFs are usable as functions that are unique (owing to manufacturing variations inherent in electronic devices), unpredictable, but repeatable. The output of a PUF is hard to clone, and it has a high level of randomness, thus strengthening the level of security. PUFs may be used to generate at least two types of output: binary or ternary.

As used herein in connection with a background discussion of the use of PUFs to secure passwords and other access credentials, the measured physical characteristics of PUF devices in a PUF array may be referred to as "responses". Typically, a "response" will be generated contemporaneously, during an authentication cycle. In certain embodiments, a previously measured set of PUF responses, which are stored for future use, may be referred to as previously measured responses. In certain embodiments, these previously measured responses may be referred to as "challenges" to which the "responses" are compared. The previously measured responses (i.e., the "challenges") are generally created upfront, during a client enrollment process, and are stored in a database. The responses are made during access control tours or cycles or authentication tours or cycles.

In conventional password management systems, in contrast to those described herein, a PUF is located in a client device, while a server device (which controls access) is in possession of a comprehensive characterization of PUF responses, referred to as an image. As will become clear, however, in the systems described in this disclosure, no PUF image is required, and the access control entity (i.e., the server) possesses the PUF.

Many types of physical devices are usable to generate PUFs. Exemplary devices include ring oscillators, Memory structures, SRAM, DRAM, Flash, ReRAM, and MRAM. SRAM arrays, in particular, have proven to be useful to generate ternary PUFs. SRAMs, like other devices usable for PUFS, have natural intrinsic manufacturing variations that can be exploited as a PUF. SRAMs are typically used as PUFs by measuring the initial logic state of the SRAM cells upon initial power-up. After initial power-up, some cells will be consistently 0s, others will be consistently is, and others will be unstable—sometimes 0s and sometimes 1s. These three conditions may be used for ternary response generation. The pattern of 1s, 0s, and unstable or "X" states will be unique for each SRAM array.

Several security applications have used the SRAM PUF. Usually, the SRAM PUF is located on the client-side as a fingerprint for the client. In such systems, the SRAM PUF has been used to encrypt the password manager database on the server-side and can be used for authentication and generating temporary passwords as well as for one-way encryption. While SRAM based PUFs used for password management and authentication are useful, such systems are amenable to improvement.

BRIEF SUMMARY

The following disclosure describes systems and methods for using the PUF on the server-side; it allows the PUF to encrypt the user ID and password as well as some of the database content in the server. Additionally, inventive embodiments may include a password generator protocol to generate a temporary password (TPW). In particular, the present disclosure describes methods to utilize a ReRAM PUF to encrypt a password manager database, generate a temporary password, and authenticate that temporary password without storing the temporary password in the database. Described herein is an architecture enabling use of a ReRAM PUF on the server-side to encrypt the password manager database, and the disclosure describes how the challenges are produced from the ReRAM PUF. In addition, this disclosure provides the architecture of the password generator based on ReRAM and how users can be authenticated based on a ReRAM PUF. Specifically, this disclosure describes how the ReRAM can be used instead of the SRAM.

The inventive embodiments described below include ReRAM-based PUFs. Such PUFs are realized in addressable arrays of resistive random access memory cells. In the embodiments disclosed below, a very low power current is injected into the cell of a ReRAM, and a resulting resistance value or voltage value is returned. Several cells are selected for a resistance measurement. In one embodiment, several cells are identified and injected with the same current to obtain several resistance values. The median value of those resistance values is calculated. Then, the resistance values of the selected cells and their median value are compared. If the resistance value is higher than the median, the cell response is considered 1, and if it is less than the median, the response is given a value of 0; if it is the same, the value is ignored. Indeed, in preferred embodiments, an exclusion band (e.g, +/−10% of the median resistance value) is defined, and cells with resistances within the exclusion band are ignored. Such embodiments are useful for screening out erratic or "flaky" or "fluky" cells, which might otherwise tend to return 1s on some measurement cycles and 0s on other measurement cycles. From the several resistances, a bitstream can be obtained.

In alternative embodiments disclosed below, a method is illustrated to choose from the stable addresses and avoid the unstable addresses.

With a bitstream generated according to the methods above, a ReRAM PUF can be used for authentication, generating TPWs, and one-way encryption for the database of the password manager. In one embodiment, this is accomplished by generating an initial response bitstream (i.e., a "challenge") corresponding to a user ID and password and storing them in the password manager database instead of having the plaintext or hash of the plaintext of the user ID and password. When encrypted in this manner, no one can understand the database content unless the ReRAM PUF is stolen. So, the real user ID and password are encrypted as one-way encryption based on the ReRAM PUF. Later, during an authentication cycle, a user/client device may supply a user ID and/or password, a set of PUF responses is generated, and these responses are compared to the initially stored responses to authenticate the user/client.

As the ReRAM PUF can generate random numbers with a high level of randomness, this attribute can also be used to generate a temporary code or a one-time password based on the ReRAM PUF. By having the bitstream produced from the comparison of the median of the resistances and the resistance value itself, this bitstream can be used as a temporary password that can be authenticated later without storing this temporary password in the memory or the database at all. As described herein, this method shows how to generate temporary codes and authentications.

In one embodiment, a method of authenticating users of a computing system is provided. The method includes causing processing circuitry of the computing system to execute a number of steps. The steps include an enrollment process by which the computing system receives first user credentials, generates a first message on the basis of the user credentials, the first message identifying devices in an array of physical unclonable function devices (a PUF array), wherein the PUF array is an array of ReRAM devices and supplies a probe current and measuring the resistance of the devices in the PUF array identified by the first message, resulting in a first array of resistance values. Then the system computes a first median resistance value from the resistance values in the first array, compares each resistance value in the first array to the first median, generates an enrollment bitstream on the basis of the comparison, and stores the enrollment bitstream in an addressable database.

During an authentication cycle, the system receives second user credentials, generates a second message on the basis of the user credentials, the second message identifying devices in the PUF array, supplies the probe current and measuring the resistance of the devices in the PUF array identified by the second message, resulting in a second array of resistance values, computes a second median resistance value from the resistance values in the second array, and compares each resistance value in the second array to the second median, and generates an authentication bitstream on the basis of the comparison. Then the enrollment and authentication bitstreams are compared to determine whether a user is authentic.

In this system, erratic cells may be excluded from the enrollment and authentication bitstreams with masking information. The masks identify measured cells having resistances that are too close to the relevant median resistance values.

In another embodiment, this bitstream generation and comparison process is performed separately on enrollment and authentication bitstreams built from a user ID and a password separately.

Another embodiment is directed to a method of authenticating a user using a temporary password. The method involves generating and sending a temporary password. In this method a computing system receives a first user identifier from a user, generates a random number, and on the basis of the random number, generates a first message, the first message identifying devices in an array of physical unclonable function devices (a PUF array), wherein the PUF array is an array of ReRAM devices. Then the system supplies a probe current and measures the resistance of the devices in the PUF array identified by the first message, resulting in a first array of resistance values. The system then computes a first median resistance value from the resistance values in the first array, compares each resistance value in the first array to the first median, and generates a first temporary password bitstream on the basis of the comparison and sends the first temporary password bitstream to the user and stores the random number in a database in association with the first user identifier and timing information relating to the time the random number was generated.

Later, when the user attempts to use the temporary password, the system receives a temporary password bitstream and a user identifier from a user. The system looks up the timing information on the basis of the received user identifier and retrieves the random number from the database on the basis of the user identifier and analyzes the timing information to determine whether the random number is expired. If the number is not expired, the system generates a second message identifying devices in the PUF array, supplies a probe current and measures the resistance of the devices in the PUF array identified by the second message, resulting in a second array of resistance values. The system then computes a second median resistance value from the resistance values in the second array, compares each resistance value in the second array to the second median, and generates an authentication bitstream on the basis of the comparison. Then the system compares the second temporary password bitstream and the authentication bitstream to determine whether a user is authentic.

ReRAM based, server-side password management schemes such as those disclosed herein have certain advantages in terms of hardware authentication, trust, and security. In the inventive embodiments disclosed herein, the ReRAM PUF response is based on the resistance (absolute or relative) of a ReRAM cell as it is subjected to a low-level probe current or equivalently a low-level bias voltage. When measured under such circumstances, ReRAMs make attractive PUFs because their elements operate at very low voltage, low power, and are very fast to program and read. These properties are highly desirable for secure operations, because they allow for the design of low power devices and devices that are also resistant to side-channel attacks. In particular, differential power analysis (DPA) and electromagnetic interference analysis coupled with fault injections are not effective in mining the secret keys that are stored in ReRAMs. Moreover, ReRAMs used in the manner disclosed herein have very high intrinsic randomness, both within individual devices and across devices, and so, are usable to generate a very dense field of PUF responses. Resistance of an individual ReRAM cell varies widely, uniquely and largely unpredictably (but repeatably) within cells and across cells, making these devices highly suitable for use as PUFs.

Additional advantages will become clear upon consideration of the following detailed description and drawings.

BRIEF DESCRIPTION OF THE DRAWINGS

The drawings described herein constitute part of this specification and includes exemplary embodiments of the present invention which may be embodied in various forms. It is to be understood that in some instances, various aspects of the invention may be shown exaggerated or enlarged to facilitate an understanding of the invention. Therefore, drawings may not be to scale.

DETAILED DESCRIPTION

The described features, advantages, and characteristics may be combined in any suitable manner in one or more embodiments. One skilled in the relevant art will recognize that the hardware arrangements and methods described herein may be practiced without one or more of the specific features or advantages of a particular embodiment. In other instances, additional features and advantages may be recognized in certain embodiments that may not be present in all embodiments.

Reference throughout this specification to "one embodiment," "an embodiment," or similar language means that a particular feature, structure, or characteristic described in connection with the embodiment is included in at least one embodiment. Thus, appearances of the phrase "in one embodiment," "in an embodiment," and similar language throughout this specification may, but do not necessarily, all refer to the same embodiment. References to "users" refer generally to individuals accessing a particular computing device (i.e., a "client") or resource, to an external computing device accessing a particular computing device or resource, or to various processes executing in any combination of hardware, software, or firmware that access a particular computing device or resource. Similarly, references to a "server" refer generally to a computing device acting as a server, or processes executing in any combination of hardware, software, or firmware that access control access to a particular computing device or resource.

As was stated above, conventional authentication systems that store user or client credentials such as passwords and user IDs have disadvantages. For example, if an attacker gains access to a lookup table or database storing the user authentication information, the attacker can apply various computational approaches to eventually decrypt or otherwise decode the information. As an example, since many hashing functions are well-known, an attacker may guess a password, input that guessed password into a hashing function and find the output in the compromised table.

Accordingly, embodiments disclosed herein address these and other shortcomings by ensuring that authentication data remains secure even if that data is accessed or stolen. Rather than storing authentication data such as password as message digests produced by hash functions, embodiments herein use message digests to generate queries supplied to a physical unclonable function (PUF) device. The resulting responses obtained are then stored. If an attacker obtains access to the authentication data, attempting to "guess" passwords is useless, because neither passwords nor hashes of passwords are stored by the system. Because each PUF device is unique, the only way to identify a valid password by guessing would require the attacker to have access the PUF.

Figure 1:
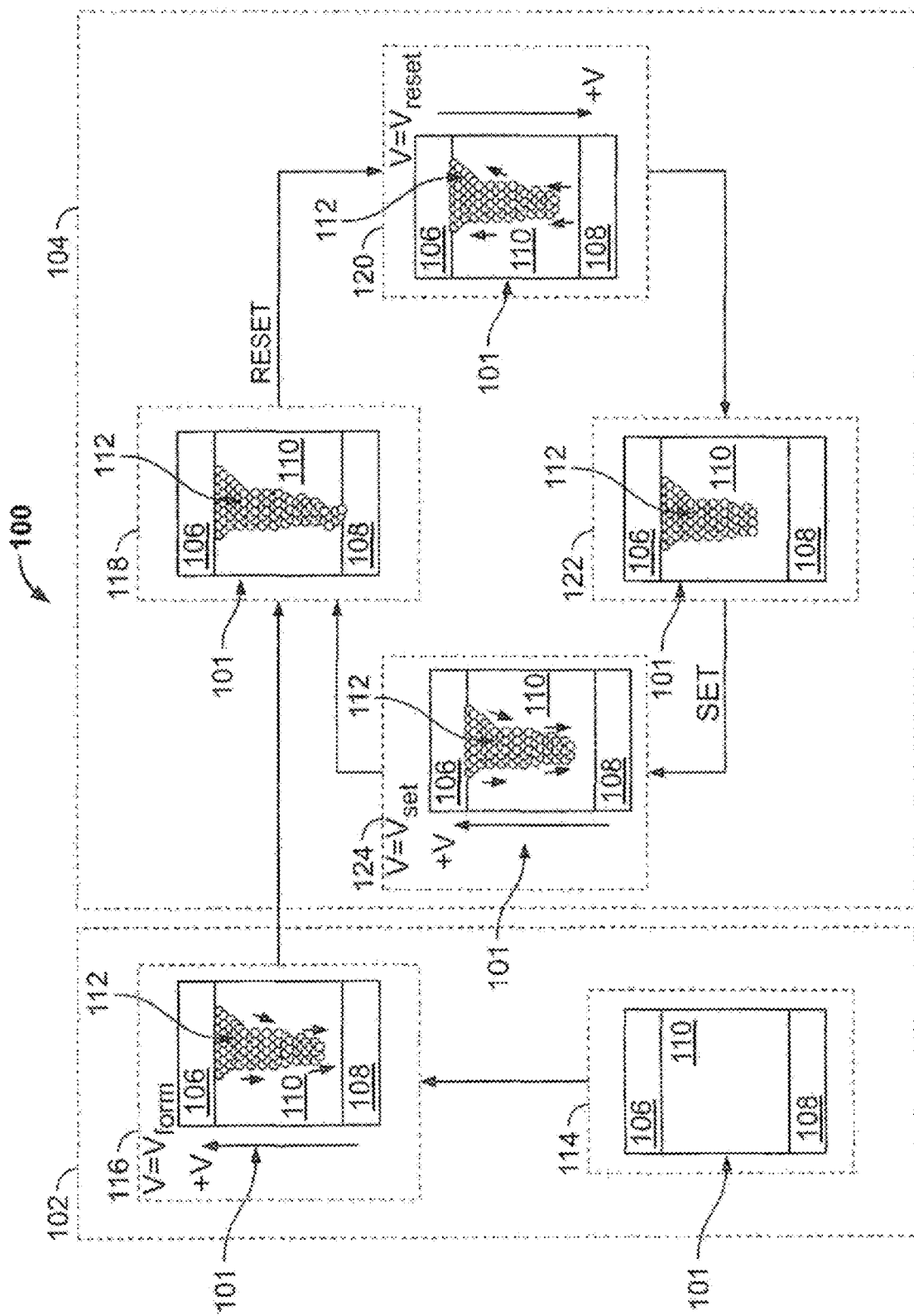
FIG. 1 is a schematic depicting the forming and programming of a Resistive RAM (ReRAM) array.

Embodiments described herein use resistance measurements from ReRAM devices as PUF responses. FIG. 1 shows an illustrative state diagram 100 depicting the transition of a given ReRAM cell 101 through various states as the cell undergoes forming, programming, and erasing processes. After forming, the cells of ReRAMs have two levels of resistance, the high resistance state (HRS) 122 to store a "1" and a low resistance state (LRS) 118 to store a "0". For example, the LRS may correspond to a resistance of about 5 k$\Omega$ and the HRS may correspond to a resistance of about 100 k$\Omega$, whereas the resistance between the electrodes of the ReRAM cell 101 may have a resistance of 20 M$\Omega$ prior to forming. Each cell has an active top electrode 106, the anode, susceptible to the release positive ions (e.g., metallic ions or oxygen vacancies), a neutral bottom electrode 108, the cathode, and a dielectric 110 allowing the positive ions to migrate when subject to an electric field E. The electric field E is proportional to the voltage V applied between the two electrodes.

During a forming cycle 102, all cells of a ReRAM device (e.g., including the ReRAM cell 101) are conditioned with the formation of a conductive filament 112, which reduces the resistance between the two electrodes 106 and 108. For example, the conductive filament 112 may include positive ions (e.g., metallic ions or oxygen vacancies) that migrate from the top electrode 106 when subject to an electric field generated when a voltage Vform is applied across the top electrode 106 and the bottom electrode 108. In this way, the ReRAM cell 101 transitions from an "unformed" state 114 to a "formed" state 116. The energy needed during the forming cycle 102 is relatively high, and is part of the upfront conditioning of the ReRAM cell 101. It should be noted that the majority of the conductive filament 112 formed during the forming cycle 102 may be considered permanent, with the remaining portion of the conductive filament 112 forming a temporary conductive path that may be broken and re-formed via the application of positive or negative voltage across the top electrode 106 and the bottom electrode 108.

As shown, the subsequent program/erase cycles 104 involve the breaking or re-forming the conductive filament 112 to write a "0" (LRS), or a "1" (HRS). The energy needed to "reset", i.e., to break the filament, and to "set", i.e., re-form the filament is much lower than the energy that is needed in the forming process. For example, the ReRAM cell 101 may be in the logic "0" LRS 118 immediately after forming, with the conductive filament 112 providing an electrically conductive path between the top electrode 106 and the bottom electrode 108, and thereby lowering the resistance between the top electrode 106 and the bottom electrode 108. When it is desired to set the ReRAM cell 101 to a logic "high" state (e.g., the logic "1" HRS 122), a reset voltage Vreset may be applied between the top electrode 106 and the bottom electrode 108 during an intermediate resetting state 120. In the present example, Vreset may generally be within a range of around −0.1 V to −0.3 V. During the intermediate resetting state 120, the ions of the conductive filament 112 may "break", moving away from the bottom electrode 108 as a result of the applied electric field. This breaking of the conductive filament 112 may increase the resistance between the top electrode 106 and the bottom electrode 108, causing the ReRAM cell 101 to enter the logic "1" HRS 122. When it is desired to set the ReRAM cell 101 to a logic "low" state (e.g., the logic "0" HRS 118), a set voltage Vset (sometimes referred to as a re-forming voltage) may be applied between the bottom electrode 108 and the top electrode 106 during an intermediate re-forming state 124. During the intermediate re-forming state 124, the ions of the conductive filament 112 may move back toward the bottom electrode 108 as a result of the applied electric field. This re-forming of the conductive filament 112 (e.g., to contact the bottom electrode 108) may decrease the resistance between the top electrode 106 and the bottom electrode 108, causing the ReRAM cell 101 to enter the logic "0" LRS 118.

While the exemplary ReRAM device described in reference to FIG. 1 is intended for use as a binary storage device (with 1s and 0s represented by cells having a high resistance or low resistance state, or vice versa), the devices may be used in other ways to realize a PUF. It has been observed that the resistance (or equivalently the voltage) of a ReRAM cell will vary unpredictably but repeatably with the application of a probe current. U.S. Published Application No. 2022/0197599 entitled "TRUE RANDOM NUMBER GENERATION FROM PRE-FORMED RERAM ARRAYS" describes how the resistances of pre-formed ReRAM cells are random but repeatable, both within a cell as a function of current, and across cells. The entirety of the disclosure of the foregoing reference is incorporated herein by reference in its entirety for all purposes. This repeatable randomness is exploited, optionally for either or both of pre-formed and formed ReRAM cells, for the arrangements and methods described herein.

Figure 2:
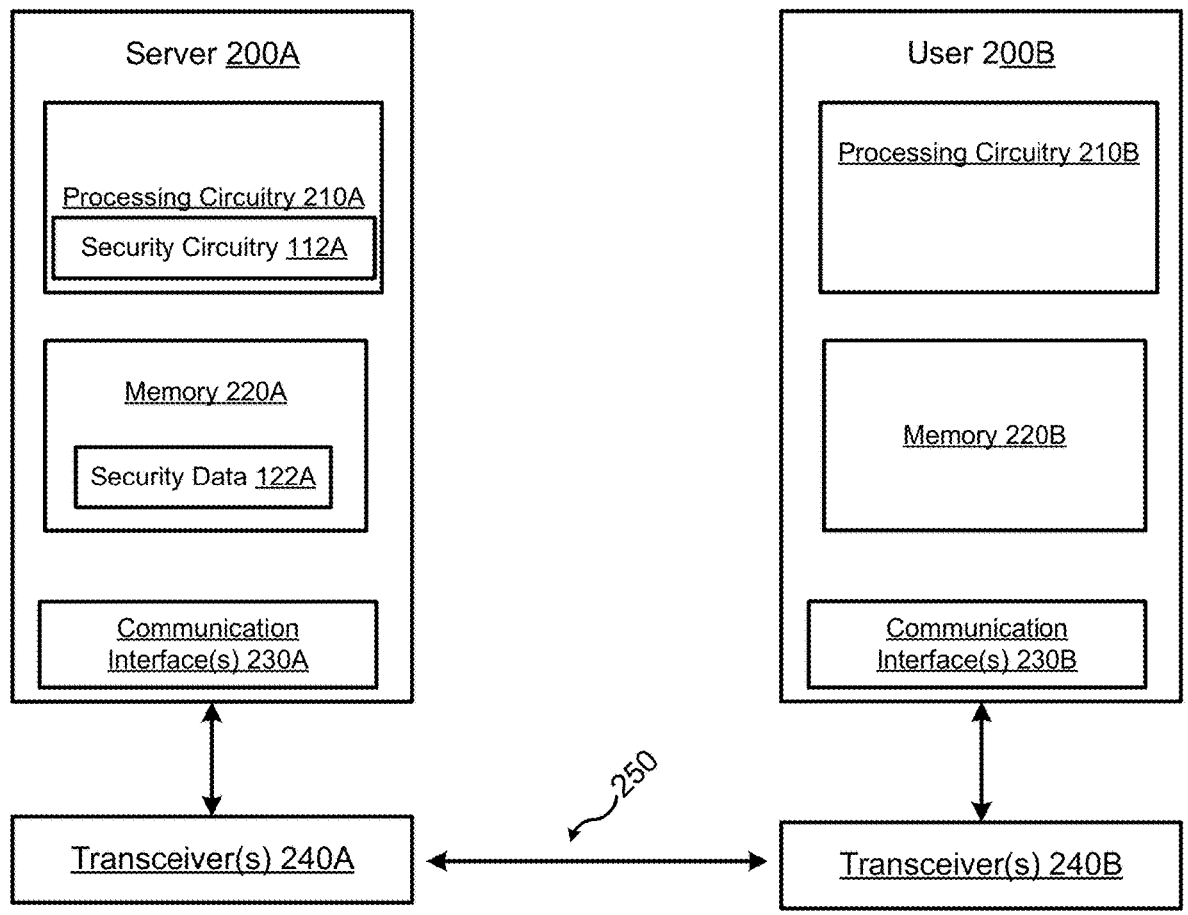
FIG. 2 depicts a block diagram describing example systems in which embodiments of the invention may be practiced.

FIG. 2 shows a schematic illustration of a computing system in which embodiments disclosed herein may be practiced. In this example, server 200A is an authentication server or other computing device which stores information used to authenticate users and client 200B is an example "client" or other "user" device. The computing systems 200A/B each have respective processing circuitry 210A/B, memory 220A/B, communication interfaces 230A/B, and transceivers 240A/B. Each system communicates sends and/or receives information via its communication interface 240A/B. The communication interfaces 230A/B are coupled to transceivers 240A/B which send signals over a communication channel 250. In embodiments disclosed herein the processing circuitry 210A of server 200A includes security circuitry 212A. Similarly, in embodiments disclosed herein the memory 220A of computing system 210A stores security data 222A. It should be understood that while the example of FIG. 2 involves a separate client 200B, embodiments disclosed herein may be practiced entirely within a single system such as the server 200A. Alternatively, in preferred embodiments, the methods set forth below are usable with multiple clients or users.

In preferred embodiments disclosed herein, the processing circuitry 210A of the server includes a dedicated PUF device such as the devices described later in connection with the embodiments discussed below, including in reference to FIG. 3. In such embodiments, the security circuitry 210A is configured to respond to an authentication query which specifies an address (or range of addresses) in the PUF device and a set of operations to perform (e.g., a probe current level) in order to generate a unique response to the authentication challenge. Such embodiments are designed to store security data 222A produced using the security circuitry 212A in the memory 220A. In such embodiments, the processing circuitry 210A is configured to query (i.e., measure) the PUF receive responses to those queries. The responses are saved as part of the security data 222A.

It should be noted that in addition to the features set forth above, server 200A and client 200B may also have the conventional components associated with general purpose computing devices, for example, programmable processors and user input/output devices like displays, microphones, keyboards, mice, etc. Additionally, memories 220A/B, which are preferably non-volatile, may store computer readable, computer executable instructions that, when executed by the programmable processors of the server and client devices, cause those processors to execute and/or direct the method steps set forth below.

As was stated, the client device 200A in FIG. 2, may have security circuitry 212A, which includes an addressable PUF array of PUF devices and associated electronics to supply a query (e.g., address information for the PUF and PUF measurement conditions) to the PUF and measure responses (i.e., physical characteristics of PUF devices such as the resistance of the devices). As used here, a query may be thought of information necessary to identify specific PUF devices (e.g., device addresses), and information specifying conditions under which a measurement is to be made (e.g., temperature, probe current, etc.). The term "challenge instructions" may also be used equivalently. Elsewhere a "challenge" may refer to a previously measured and stored set of responses that is compared to a contemporaneously measured set of responses for authentication. A client device may include both a PUF array and associated circuity to query or measure the PUF, and generate a resulting response bitstream. Such circuity may include read/write buffers, a microprocessor current drivers, etc. Together a PUF array and the associated read/right circuity will be referred to as an "APG".

Figure 3:
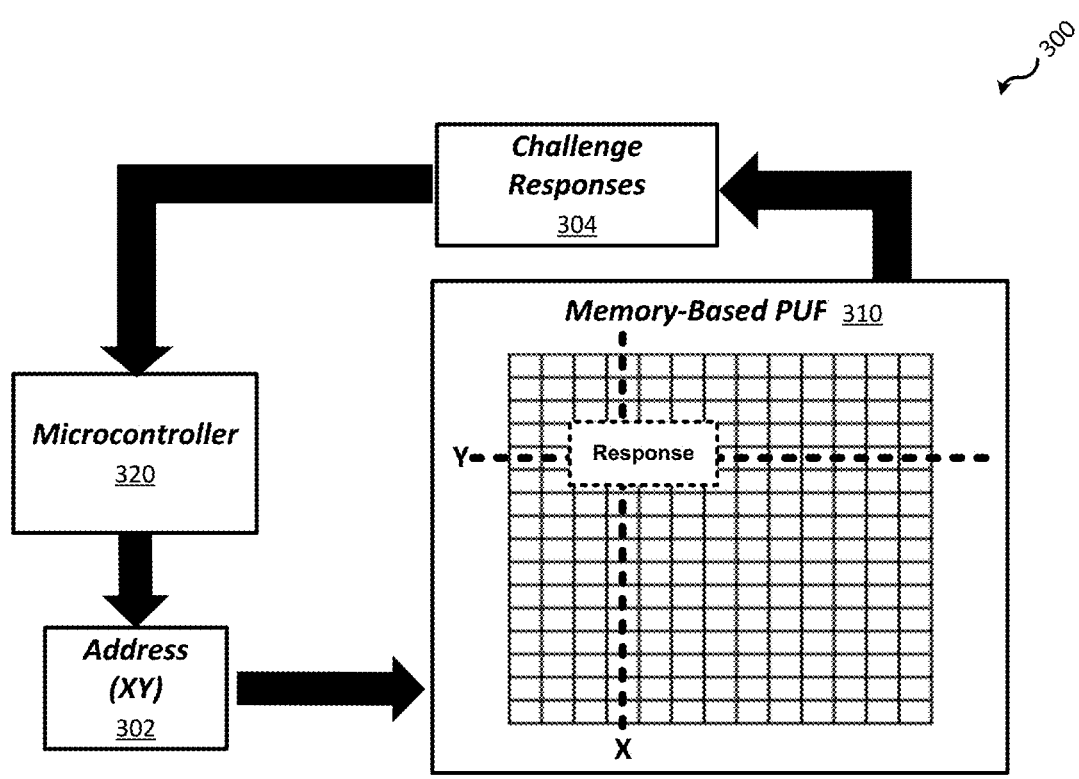
FIG. 3 depicts a schematic view of an example memory-based physical unclonable function (PUF) device usable to generate response.

FIG. 3 is a schematic of a memory-based addressable PUF generator (APG) 300. In a simplified example, a microcontroller 320 (which may be included in the processing circuity described in connection with FIG. 2 above) accesses an address (or range of addresses) 302 of the PUF array 310, and receives a response 304. In the simplest case, the address 302 is the query and the values stored in the PUF array 310 are the responses 304. Alternatively, the microcontroller 320 may execute instructions causing it to perform a set of mathematical or other operations (which, together with the specified address or address range 302 constitute the query) on the values retrieved from the PUF array 310. Alternatively, another generic method to generate challenge responses from memory devices is to characterize a particular parameter P of the cells of the array. The values of parameter P vary cell to cell and follow a distribution with a median value T. Assuming that the measurement results from one PUF device are distinct from those of any other PUF device and that the measurement results of any one PUF device are suitably reproducible, resulting streams of data can be used as PUF challenge responses for authentication purposes, where the input used to generate each response is stored for future use as a challenge.

Because the PUF is secured within the server (and may be further protected using known anti-tampering methods), a hostile party cannot simply read the entire PUF array and use the information to communicate with a network of client devices. Physically reproducing ("cloning") the entire PUF device array would be a security threat; however, the random variations in circuit fabrication and other manufacturing methods which make it possible to fabricate unique PUF arrays using identical manufacturing steps possible in the first place make it unlikely that a hostile part could replicate a given PUF device array even if the design of that device were known.

In the embodiments described below, the underlying devices in an example PUF device may include memory structures, such as ReRAMs.

Figure 4:
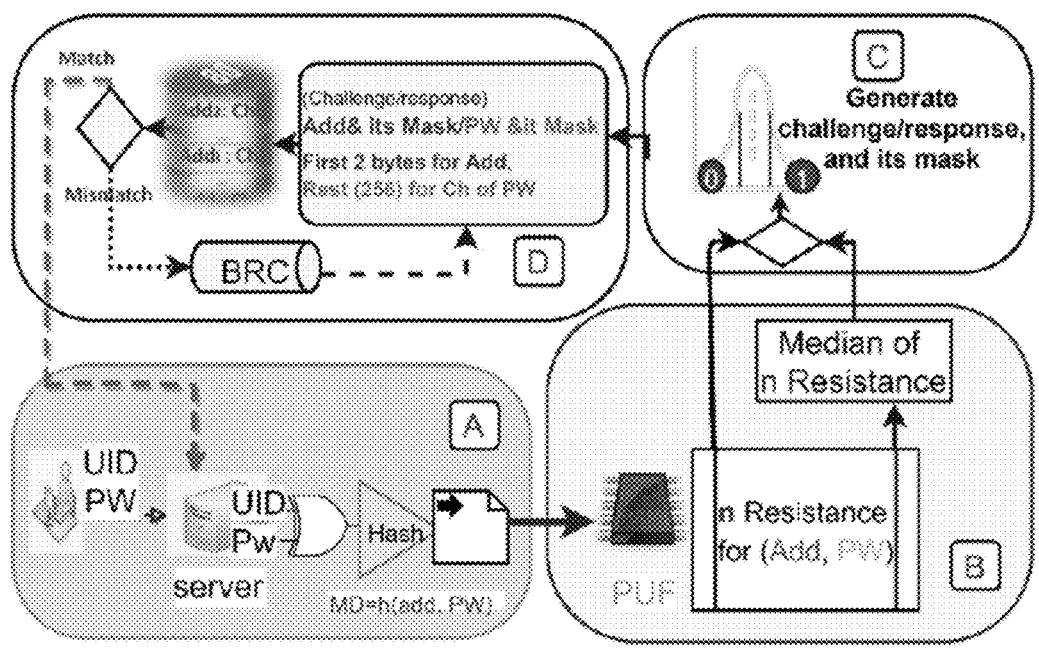
FIG. 4 depicts a diagram of a protocol that can encrypt the database of the password manager based on a ReRAM PUF.

In the embodiments described below, a low-level probe current is applied to each identified PUF device and the resistance (or voltage) of the device is read. Although reading the ReRAM cells gives an analog value, this analog information is used to generate a binary stream. This process is shown in FIG. 4, which is a flow diagram showing how a server device in possession of a ReRAM PUF based APG can generate a binary stream from analog measurements of the PUF devices. In the arrangement of FIG. 4, a set of PUF addresses is generated, and the resistance of the devices at each address are measured. In preferred embodiments, each device is measured with a predetermined probe current, but in other embodiments a number of different predetermined probe currents are used. The resulting resistances are analyzed to determine a median value. Devices having resistance on one side (e.g., above) the median value are designated as 1s; devices having resistances on the other side of the median value (e.g., below) are designated as 0s, and devices having resistance at the median value are ignored. Alternatively and preferably, an exclusion band can be set around the median value (e.g., +/−10% of the median), and all devices within this band are ignored or masked. This may be useful to exclude unstable or erratic cells. Thus, the reading of several cells in the ReRAM PUF with the median value of these cells' values can help create zeros and ones. This binary stream can be stored in a database for authentication purposes.

Figure 6:
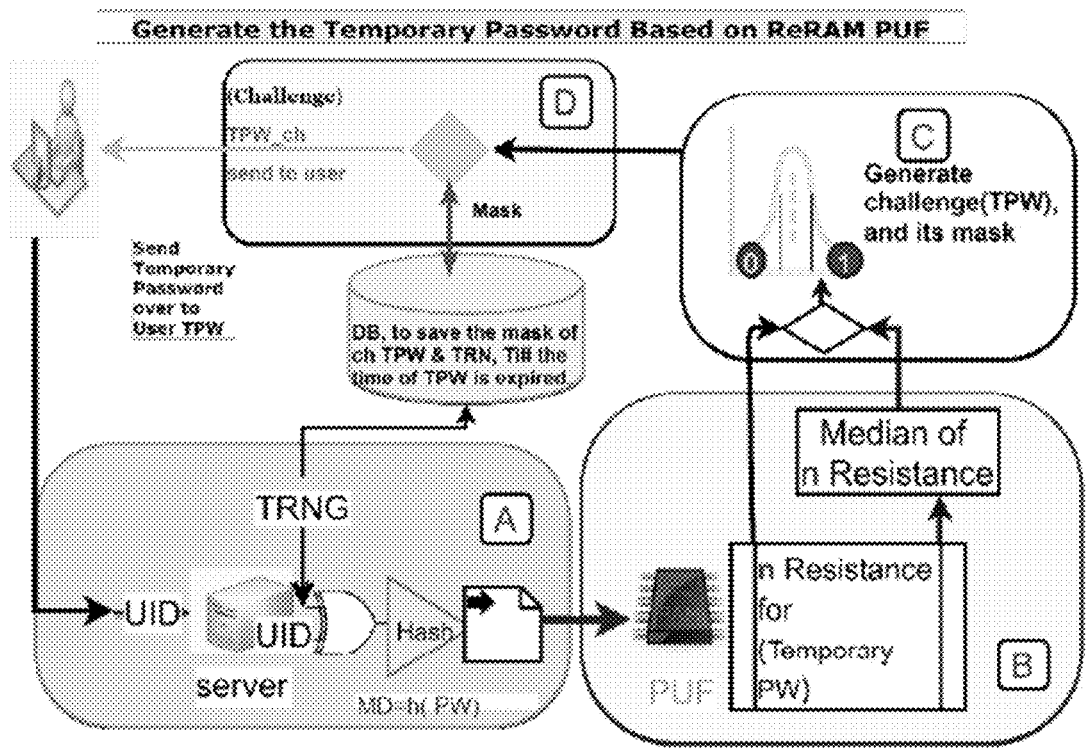
FIG. 6 depicts a diagram of the steps to generate a temporary password based on a ReRAM PUF.

In addition, using the same method to read the ReRAM cells and to make the comparison among the median value and the cell values helps produce a binary stream that can be used for a temporary password. FIG. 6 is a schematic flow chart showing a process where a temporary password is generated and authenticated. In the disclosure that follows, methods are described for using a ReRAM PUF to secure a password manager database and for generating a temporary password for authentication based on the ReRAM PUF.

Password Manager Database Based on ReRAM PUFs

FIG. 4 shows the stages of the password manager protocol and how a user ID and password are encrypted and stored in the database. That protocol will be summarized before being described in detail in relation to FIG. 4.

First, in an enrollment process, the server device receives a password and a user ID. Each of the password and the user ID are subjected to a one-way cryptographic function, such as a cryptographic hash, resulting in two message digests. The hashing algorithm is selected to generate an output having a predetermined bit length (e.g., 256 bits). Each message digest identifies a series of device addresses in the server's PUF (i.e., a first set of addresses and a second set of addresses). Preferably, the output of the hash function is read such that each byte identifies an address in the PUF. For each of the first and second sets of addresses, a probe current is supplied to the devices having the addresses, and resistance values for those devices are obtained. This results in a first array or set of resistance values and a second array or set of resistance values, the first array corresponding to the addresses identified by the hashed password and the second array corresponding to the addresses identified by the hashed user ID. For each set of resistance values, a median resistance is computed. The resistance values in the two sets are then compared to the median values for each array. Resistance values that are below the median are designated 0s and resistance values that are above the median are designated 1s. The two bitstreams (one generated by the user ID and one generated by the password) are stored at the server.

Preferably, the server also generates and stores two masks that exclude bits in the bitstreams corresponding to cells having a resistance that is close to that array's median value. In these embodiments, which are optional but preferred, an exclusion band around the median for each array of resistance measurements. The exclusion band (visible in FIGS. 5A and 5B) designates a range of resistance values about the median that will be excluded (e.g., plus/minus 1%, 2%, 3%, 5%, 10%, 15%, etc. of the median value). Alternatively, the exclusion band is defined as a number of cells, e.g., the closest 5 cells on either side of the median. Preferably, the same exclusion band is defined for both the user ID and the password measurements, but this is not a requirement. To exclude bits within the band, a mask bitstream is built for each of the resistance bitstreams. For bits in the resistance bitstream having resistance values outside of the exclusion band (i.e., stable cells), the mask bitstream is given a "0" at that position; for bits in the resistance bitstream having resistance values within the exclusion band (i.e., erratic or fuzzy cells), the mask bitstream is given a "1".

Resistance values that are within the mask will be ignored during the authentication cycle. The result of the enrollment process described above is two pairs of bitstreams: one bitstream that corresponds to the resistance values of addresses identified by the hashed password, a mask for these addresses, and another bitstream that corresponds to resistance values of addresses identified by the hashed user ID, and a mask for these addresses. These bitstreams are stored by the server.

To later authenticate a user, this process is repeated: a user ID and password are received (preferably at least one of which is received from a user/client seeking authentication). These are separately hashed to result in address sets, the devices having the addresses are measured generating two arrays of resistance measurements, the medians are calculated and binary bitstreams are generated for each array by comparison to their respective medians. Additionally, an exclusion band is defined (preferably the same exclusion band that was applied during the enrollment process) and a response mask is generated as above to exclude cells in the newly measured bitstreams that correspond to erratic cells. The new response bitstream generated by the user ID is then compared with the corresponding previously measured bitstream, and the new response bitstream generated by the password is compared with the corresponding previously measured bitstream.

Before comparison, each pair of corresponding bitstreams has its masks applied to eliminate erratic cells. Both masks are applied to both bitstreams prior to comparison of the remaining bits. That is to say, in a certain embodiment, if a cell address is excluded as within the fuzzy zone during either of the enrollment or authentication measurements, that cell is dropped from both bitstreams before comparison. In another embodiment, the enrollment masks are applied to the enrollment bitstreams, and the authentication masks are applied to the authentication bitstream. In yet another embodiment, both bitstreams are filtered by one of the enrollment or authentication masks. In yet another embodiment, the masks are swapped, and the enrollment bitstream is filtered with the authentication mask and vice versa.

If the masked bitstreams match, the server knows that it has received the same user ID and password during the authentication cycle that it received during the enrollment cycle, and the user/client is authenticated. When the user/client is authenticated, the server may authorize communication with the client. When the user/client is not authenticated, the server may declare an alert condition, and may refuse communication with the client. Whether the masked bitstreams match will be discussed further below in connection with additional examples.

It will be noted that this process never requires storage of the user ID or password at the server. Instead, the ReRAM response bitstreams corresponding to one or both of these pieces of authentication information are stored, and a second occurrence of the password and/or user ID is checked against the enrolled password and/or user ID by generating another response bitstream with the PUF and comparing with the stored bitstream. In preferred embodiments, the server deletes, or does not store, at least the password and optionally the user ID after enrollment.

Referring to this process in detail, in reference to FIG. 4, the protocol has four stages A, B, C, and D as described below.

In stage A, a server (which may be the server illustrated in connection with FIG. 2), receives a password and user ID. The password and user ID may be supplied to the server by a client, or by a user using the client. Optionally, the user ID may be retrieved by the server from memory. The user ID and password are then fed separately to a hash function. Exemplary usable hash functions include SHA-1, SHA-3, MD2, MD5, SHA-256, and SHA-512, but any one-way cryptographic function is acceptable, and the methods described herein are agnostic as to the specific hashing algorithm used and may be used with an output hash of any bit length. In a preferred embodiment, the hash generates a 256 bit output, and each of the resulting 32 byte is read as identifying a device address in the PUF array. As a result of the hash, two message digests (MD) are created from the hash function. The first message digest is generated by a hash of the user ID, and this digest is read to obtain a first set of addresses in the server's PUF, or is otherwise subject to one or more mathematical operations (e.g., xoring of sequential bit pairs, use of an extended output function, etc.) to obtain a bitstring that may be read as a set of addresses in the PUF. The second message digest results from a hash of the password, which again may be further processed like the user ID hash to generate sufficient bits to identify a predetermined number of device addresses (e.g., 32). Thus, the second message digest is read to identify a second set of PUF addresses.

In stage B, each message digest points to the cells in the ReRAM PUF that are identified by each respective message digest. The server directs its APG to read the resistance values from the ReRAM cells corresponding to the devices in the first and second sets of addresses. These values are then stored in two arrays (an array corresponding to the password and array corresponding to the user ID) for manipulating in stage C.

There are a variety of methods that can be used to select the probe current used to measure the resistance values of the cells. In one embodiment, the probe current is pre-set. In another embodiment, the probe current is randomly generated, for example, by use of a random number generator (RNG) that is run by the server's processor or part of its security circuity. In certain embodiments, the RNG is used to generate a probe current that is within a pre-determined range of probe currents. In any of the foregoing cases, the probe current used for all cells is preferably stored such that the same probe current may be used during authentication as described below. In another embodiment, the probe current is derived from performing a mathematical operation on one or both of the password and user ID. By way of example, the password and user ID could be XORed, added, or combined in some fashion, and the result could be hashed to result in a bit stream that is read to identify a probe current. In another embodiment, the hashed user ID or the hashed password could be hashed another time, or a predetermined number of times, and the resulting bitstream used to identify a probe current. In cases where the probe current is generated from the user ID and/or password, it need not be stored for authentication since, for an authentic user, the same probe current will be generated again with the user ID and/or password information. Indeed, this arrangement adds another layer of security to the authentication procedure. In a preferred embodiment the same probe current is used for all cells measured, but this is not a requirement, so long as the same probe current is used for the same cells in both the enrollment and authentication cycles.

In stage C, there are several steps performed to convert the analog cell resistance values to digital bitstreams with zeros and ones. In the preferred embodiment, the steps include the following:

1) Calculate the median values of each resistance array, one median value for the user ID array and another for the password array, and these are named the central median (CM).

Figure 5A:
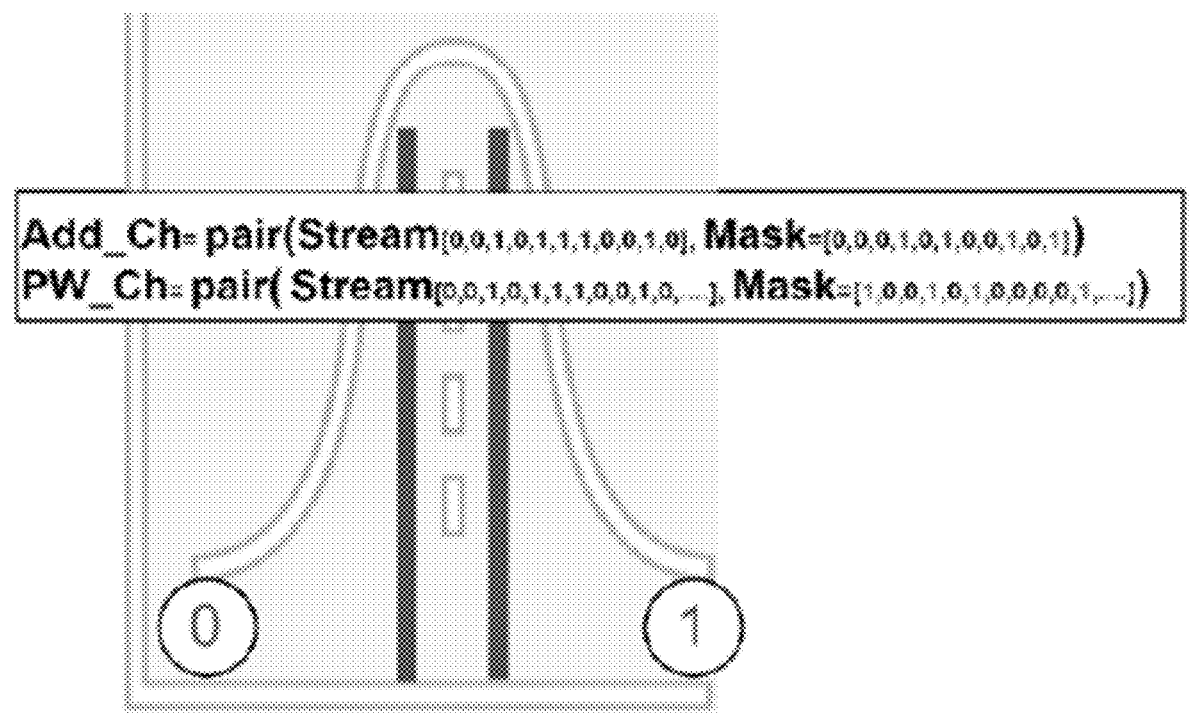
FIG. 5A depicts step C of the process of FIG. 4.
Figure 5B:
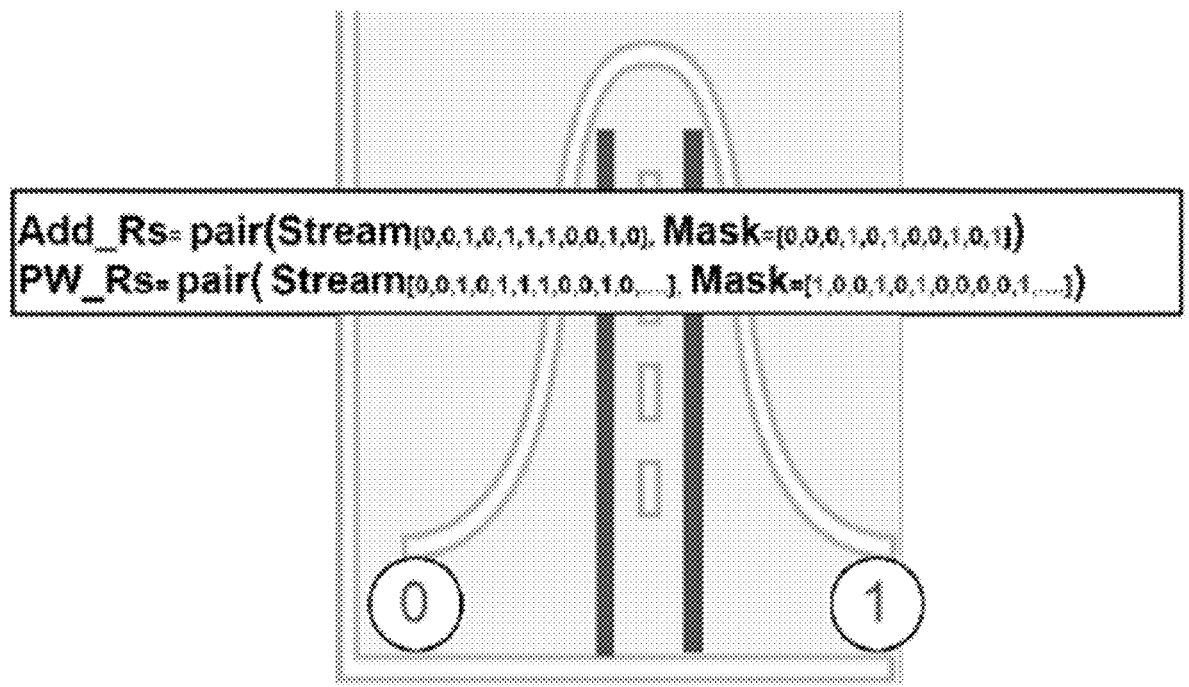
FIG. 5B depicts the masking process of FIG. 5, step C in more detail.

2) The resistance values for each cell within resistance array are compared to their respective central median.
3) Resistances close enough to the median are considered in the fuzzy area and are avoided. The range of the fuzzy area is determined by the minimum resistance values, maximum resistance values, and the median value which is usually plus and minus n of the median. N may be expressed as a percentage about the median (1, 2, 3, 5, 10, 15, etc.). The resistance values that are less than the fuzzy area are considered zeros, and the resistances that are higher than the fuzzy area are considered ones. In order to exclude the fuzzy cells from the bitstream that will be used for authentication, a mask is created designating the fuzzy cells. This mask can then be applied to blank resistance measurements that are within the fuzzy range. This mask application process is shown in FIGS. 5A and B.
4) The bitstreams reflecting the resistance values for both the hashed password and the user ID, along with their respective masks to exclude fuzzy cells are stored as two pairs. An example is shown in FIG. 5A. This pair of masked bits (one generated by the addresses identified by the hashed password and the second generated by the addresses identified by the masked user ID) are the "challenges" that will be compared to the "responses" generated during an authentication cycle. As will be described below, and as is pictured in FIG. 4, in an alternative embodiment, the user ID and password are combined (e.g., by XORing), the combination is hashed, and that hash is used to identify the cells to be measured. In this alternative, rather than generating two message digests that generate two bitstreams, there is a single message digest that generates a single bitstream. Importantly, after the one or more bitstreams reflecting the resistance measurements are stored, the password and optionally the user ID are deleted or not stored on the server machine so that they are not discoverable by an attacker.
5) To authenticate an existing user, the same operation is performed to generate the response pairs for the address and the password. That is to say, a user ID and password are received. This may occur when the user ID and password are received from a client device, or a user of a client device. Each of the user ID and password are hashed, as above, and the hash is used to identify two sets of addresses. Resistances of the cells identified by the addresses are measured, with the same probe current(s) used for the initial measurements above, at least as to corresponding cells. The median values for each set are computed, and the resistances for each cell compared to generate two binary strings. A mask is then generated and applied to drop erratic cells by applying the same exclusion criteria to the response bitstrings as applied during enrollment. That is, the masks may be computed during the authentication cycle on the basis of stored data regarding the range about the medians to be excluded. In one embodiment, both the enrollment and the response masks are applied to both the enrollment and response bitstrings prior to comparison. Alternatively, the enrollment mask is used on the response bitstring. In either case, according to the new mask and/or the mask that has been stored at the time of enrollment, the fuzzy area about the medians are avoided, and the resistance values in the outlying area are selected. So, selecting from the outlying area of the fuzzy area will eliminate the fluky cells and always guarantee that cells are constant in zeros and ones, as shown in FIGS. 5A and 5B.
6) The generated response bitstream is then sent for comparison in in stage D.

In stage D, there are now two bitstreams with their masks, one generated by the user IDs and another by the passwords. These streams are stored in the database for authentication when the user wants to sign in later. To authenticate an existing user, the same operation is performed to generate the response pairs for the address and password. According to the new mask and the mask that has been stored at the time of enrollment, the fuzzy area is avoided and the resistance values in the outlying area will be compared amongst each other. Thus, selecting from the outlying area of the fuzzy area will eliminate the fluky cells and always guarantees that cells are constant in zeros and ones, as shown in FIG. 5B.

The same process is followed for authentication, except in stage D, the streams of bits existing in the database and the response streams are compared.

In an alternative embodiment, only one of the message digests is used to identify device addresses (e.g., the message digest corresponding to the hashed user ID). The other message digest (corresponding to the hashed password) is then used to compute an array of probe current values that are used to probe the devices identified by the first message digest. In this embodiment, during enrollment, after the addresses identified with the first message digest are probed with the currents identified by the second message digest, the process proceeds as above: a median is computed for the measured currents, an exclusion band is applied about the median to exclude erratic cells, a mask is built in accordance with the exclusion band, a bitstream is built on the basis of the measured resistances by comparing them with the median, and the bitstream and mask are stored, or the mask is applied to the bitstream and the resulting masked bitstream is stored. During authentication, the process is repeated, with a newly received User ID and password, and the newly measured masked bitstream is compared with the previously stored masked bitstream for authentication. In this embodiment, the role of the password and user ID can be reversed with the user ID being hashed to generate a series of probe currents and the password being hashed to generate the addresses.

It will be noticed in the embodiment described above that matching of both the bitstreams generated by the user ID (the enrollment and authentication bitstreams) and the bitstreams generated by the password is preferably required to authenticate a user. This provides a double layer of security as part of the authentication process, but this is not a requirement. In alternative environments, a user may be validated if one or the other of a pair of bitstreams generated from either the password or user ID matches. In yet other embodiments, a matching condition between a challenge and a response bitstream may be declared with the two bitstreams match to within some degree short of 100% (e.g., have a matching bit error rate below some threshold). This may be useful where a cell previously thought to be stable (and therefore not masked by the exclusion band around the median) turns out to measure very differently between the enrollment and authentication cycles. To account for such cases, matching rates of greater than 99%, 95%, 90%, 80% and 70% are acceptable to declare a match in some embodiments. In other embodiments, response based cryptographic techniques may be used to match the bitstream, which techniques will be discussed below.

In the embodiments described below, an array of resistance measurements at a first set of addresses is compared to the median resistance of that first set, and an array of resistance measurements at a second set of addresses is compared to the median resistance of that second set. In alternative embodiments, a bitstream for the addresses identified in the first message digest is built by comparing those resistance values to the median resistances of the addresses in the second message digest, and vice versa. That is to say, for the addresses identified by the hashed password, the binary data is generated by comparing those resistances to the median of the resistances identified by the hashed user ID, and vice versa. In other embodiments, only a single masked challenge bitstream is generated for authentication, by comparing the resistances of cells identified with the first message digest to the median measurement of the cells identified by the second message digest, or vice versa, but not both.

In yet another alternative embodiment, rather than generating two message digests from separately hashing the user ID and the password, the user ID and password are combined before being hashed. The combination may be done by any suitable mathematical operation, but in a preferred embodiment (show in FIG. 4), the two are XORed. The resulting word is then hashed to generate a message digest. The message digest is read to identify a set of addresses in the PUF. The PUF is queried at those addresses, for example, by measuring a resistance of the identified devices having those addresses at a predetermined probe current. The median resistance for all measured cells is computed. Each individual cell measurement is compared with the median to generate a bitstream, and cells having lower than median resistances are binned as 0s and cells having higher than median resistances are binned as 1s. An exclusion band around the median is defined to exclude cells with resistance close to (i.e., within a percentage of, plus or minus) the median resistance. The band may be +/−1, 2, 3, 5, 10, 15, 20%, any of the percentages identified above, or any other suitable percentage. A mask is generated that excludes cells within the exclusion band. The mask and the bitstream (or optionally, the bitstream and data usable to define the exclusion band and build a new mask) are stored. For authentication, a new user ID and password are received from the client, and the process is repeated, optionally, with the assistance of the stored mask. The masked authentication cycle bitstream is compared to the stored masked bitstream to validate the user.

In yet another alternative embodiment, the arrays of resistance measurements are compared to a predetermine resistance value, rather than a median. In other embodiments, the resistance values are compared to a computed mean of the array, rather than a median. In these embodiments, it is preferred to drop bits from the bitstream if there are significantly more 1s and 0s to thwart side channel attacks.

Temporary Passwords (TPWs) Based on ReRAM PUFs

Figure 7:
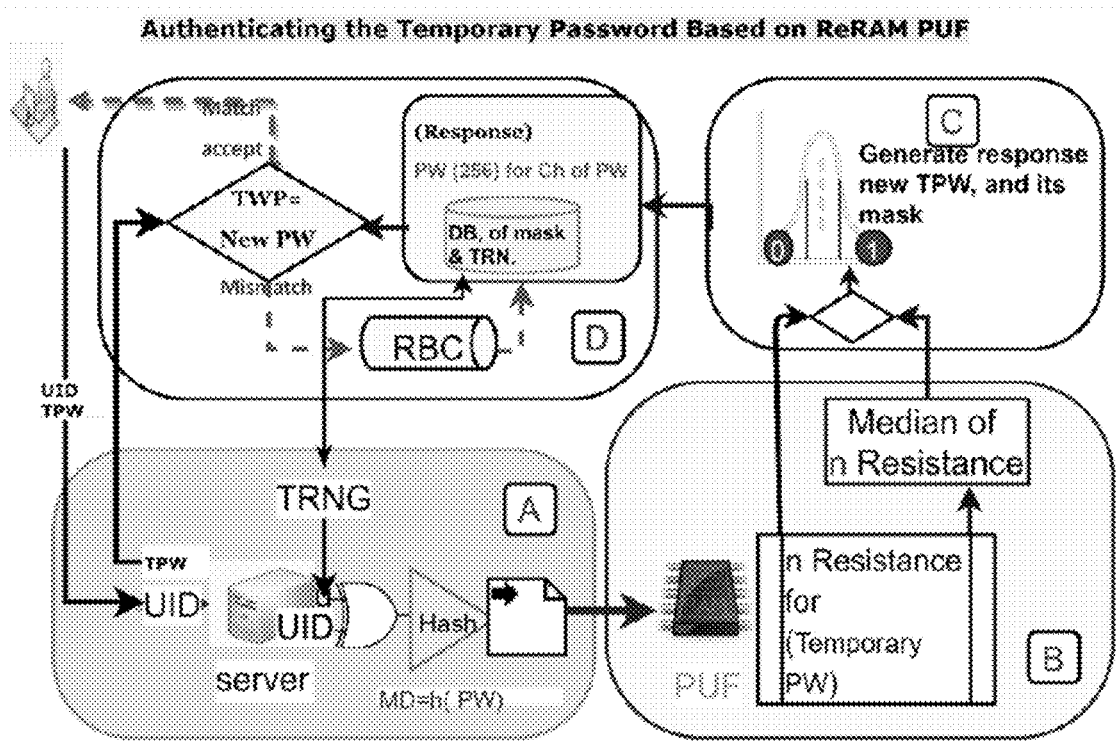
FIG. 7 depicts a diagram of the steps to authenticate a temporary password (TPW) based on a ReRAM PUF.

FIGS. 6 and 7 demonstrate how to generate a temporary code and perform authentication with FIG. 6 showing the four stages, A, B, C, and D to generate a TPW. Each stage has several steps as follows:

1) In stage A, the user ID and a true random number (TRN) are fed to the hash function to create a message digest (MD). Alternatively, a pseudo-random number generator (PRN) may be used. These random number generators may be stand-alone circuitry at the server, or preferably, they are processes running on the server's programmable processors. In alternative embodiments, the random number expires after a certain time. In a preferred embodiment, prior to hashing, the user ID and RN are combined, e.g., by XORing, and the result is hashed to result in a message digest.

2) In stage B, the message digest is read to identify cells in the ReRAM PUF. The resistance values of the cells at the identified addresses are measured at a predetermined current, or a current selected in accordance with one of the methods described above. These resistance values are stored as an array for manipulating in stage C.

3) In stage C, several steps are performed to convert the analog arrays of resistance values to digital arrays with zeros and ones:
   a. The median value of the resistances in the arrays is calculated, referred to as the central median (CM).
   b. The resistance values the array are compared, one by one, to the CM. Resistance values close enough (i.e., within an exclusion band, which may be selected as plus or minus some percentage of the CM, as described above) to the median are considered fuzzy and are excluded by building and applying a mask for those cells. Resistance values that are less than the fuzzy (outside the exclusion band) area are considered zeroes, and resistance values that are higher than the fuzzy area are considered ones (FIG. 6, Part C).
   c. The TPW and its mask are generated and the mask is applied. The resulting TPW bitstream does not include the fuzzy area resistance values whereas the mask points to the position of resistance values in the fuzzy area that have been avoided (FIG. 5A).
   d. After the comparison of the resistance values from the allowed area to generate a bitstream, this masked bitstream is sent over to the user/client device as a TPW. The mask and TRN are stored for a predetermined period of time for authentication purposes later, and then both expire after the predetermined period of time and are removed from the database (FIG. 6, Part D). Optionally, the mask and the TRN are stored in association with the user ID, but this is not a requirement. Importantly, the TPW is not stored at the server and/or is deleted so that it cannot be read directly by an attacker.

FIG. 7 shows how the TPW is authenticated through four stages A, B, C, and D for the authentication process.

1) After receiving the user ID and TPW from the user (or alternatively receiving the TPW from the user and retrieving the user ID from storage), the validation of the TRN (which is stored for a time at the server) is checked. If the TRN is still valid (i.e., not expired), then the process proceeds; otherwise, it terminates. If the process terminates, the client may request another TPW from the server, or the server may declare some alert condition and refuse further communication with the client.

2) After the user ID and TPW are received, the TRN is retrieved from the database.

3) In stage A, the user ID and the TRN are XORed and fed to the hash function to create a message digest (MD) with a valid TRN.

4) Stages B and C are the same process as generating a TPW. To authenticate the TPW, the same operation is performed to generate the response from the ReRAM PUF. According to the new mask and the mask that was stored at the time of creation, the fuzzy area is avoided (FIGS. 5A, and 5B).

5) In stage D, the new TPW (the response that has been masked) is compared to the TPW entered by or sent by the user; if they are the same, the user is accepted; otherwise, the user is rejected.

As is detailed above, a "match" may be declared between the "challenge" and "response" TPW if they match within some percentage (i.e., if the BER is below some threshold). Alternatively, a method known as "response based cryptography" ("RBC") may be used to ensure that the PUF that generated the first (enrollment or challenge) bitstream was the same that generated the second (response) bitstream. Generally speaking, under RBC the server has a bitstream or word, and it attempts to determine whether its PUF is capable of generating that bitstream or word, even in a case when there is no match to previously stored information. A no-match condition may occur, as discussed above, when one or more cells returns a much different value during the validation measurement as compared to the value returned during the enrollment process. Ideally, such erratic cells are identified and masked, but a cell may become erratic over time, or there may be some transient issue with the second measurement that leads to a discrepancy.

In such cases, RBC may be employed. Under RBC, the server takes the address list message digest, which in this case is generated by a hash of the XORed user ID and TRN, it measures the PUF addresses, computes the median, compares the cell resistances to the median to generate the bitstream, excludes the erratic cells with resistances close to the median, and then compares the resulting masked bitstream to the previously measured and masked bitstream, which in this case has been received from the user. If there is no match, the server then iteratively changes the response bitstream by flipping bits, and then comparing the perturbed bitstream to the one received as the TPW from the user. The process may perturb the response bit stream to generate a changed bitstream that is 1 Hamming distance from the original, then 2, then 3, etc., until there is a match, or until some timeout condition or Hamming distance threshold is reached. This process is generally described in U.S. Pat. No. 11,477,039 entitled "RESPONSE-BASED CRYPTOGRAPHY USING PHYSICAL UNCLONABLE FUNCTIONS", the entirety of which is incorporated by reference herein in its entirety for all purposes.

Implementation

Applicant has validated the methods set forth above experimentally. In the experimental verification set-ups described below, the following methods were employed:

Enrollment for the user:
1) On the server-side, the user ID and password are received.
2) The user ID and password are XORed and fed as input to the hash function to obtain the message digest.
3) Each byte in the message digest points to a particular cell in the ReRAM PUF.
4) The cell is read with the selected current value, and the resistance value is appended to the resistance value array.
5) The central median (CM) of the resistance value array is calculated.
6) The fuzzy area is assigned, which will be close to the CM (FIGS. 5A and 5B).
7) Two bitstream arrays (challenges) and two mask arrays are created: one is for the user ID pair, and the second one is for the password pair.
8) The selection resistance values are compared to the CM:
   a. If the resistance value is less than the CM, append "0" to the bitstream array (challenge) and append "0" to the mask array.
   b. If the resistance value is higher than the CM, append "1" to the bitstream and append "0" to the mask array.
   c. If the resistance value is in the fuzzy area and less than the CM, append "0" to the bitstream and append "1" to the mask array.
   d. If the resistance value is in the fuzzy area and higher than the CM, append "1" to the bitstream and append "1" to the mask array.
9) Repeat until the end of the bitstream array.
10) The bitstream array (challenge) and mask array are converted to a hexadecimal format and stored in the database. Two challenges are generated with their masks: one points to the address position in the database, and the other is stored corresponding to that position.

For existing users:

The same steps as user enrollment are followed except for step 10. The responses are compared, which are the new bitstream, with the challenges in the database; if they match, it is accepted. If they mismatch, the mask of the challenge and the new mask for the first position in the bitstream array are checked; if one of them is equal to '1', then the position is ignored. If not, then the new bitstream array is compared to see if they are similar. This process is performed until the end of the bitstream array. If all elements are the same, the user is authenticated.

Preliminary Results

Applicant has experimentally demonstrated the success of the arrangement and methods set forth in this disclosure. Specifically, Applicant has demonstrated the result where there was no exclusion of a band of fuzzy or ternary state cells. In the experimental arrangement that follows, the cells were measured and the median calculated, and according to the median value, the challenge or response resistances were mapped to low "0" and high "1". Applicant performed this experiment without blanking "fuzzy" cells to study the behavior of the ReRAM PUF on the password manager database protocol. Studying the behavior of the ReRAM PUF based on the password manager database protocol helps to fine tune the appropriate length of the MD and how many cells should be read from the ReRAM PUF to produce a certain size of the user's bitstream credential (UserID and PW). So, the question Applicant sought to answer is how many mismatches happen between the challenges stored in the password manager database and the responses generated each time the enrolled user wants to authenticate? Multiple experiments were undertaken to test that issue.

First Experiment

Figure 8:
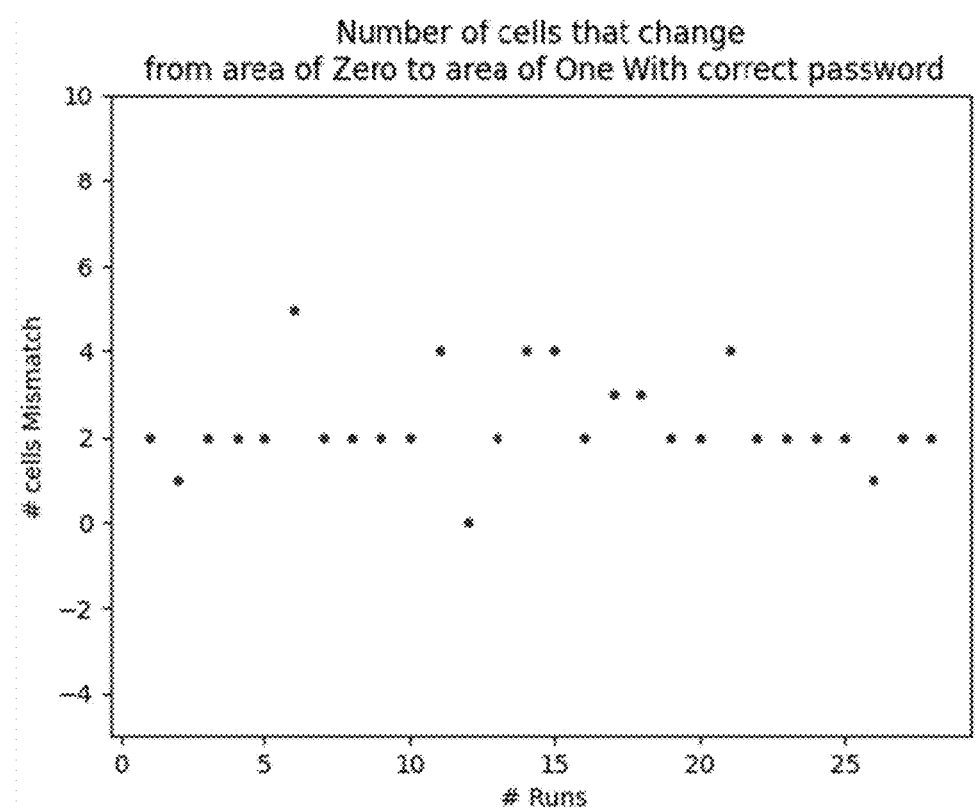
FIG. 8 depicts the results of an experiment where the same PW was saved in the database and reentered 30 times.

After running the code, a user was enrolled and stored in the database's user ID and password bitstreams. After that, the user was tested by authenticating him 30 times initially. In this experiment, the bitstream is generated directly according to the median value, not the fuzzy area. Each time, the number of mismatches was calculated between the database's streams of bits that have been stored (the challenge) and the new response. The result showed that each run had approximately 2 to 5 mismatches with the average about two mismatches in each run (FIG. 8).

Figure 9:
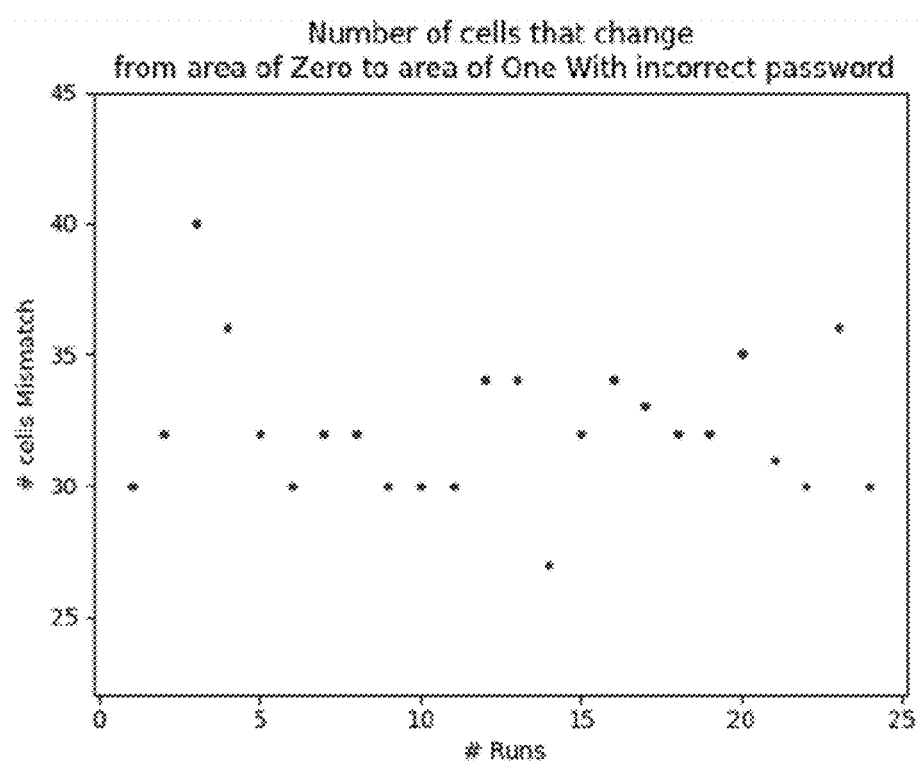
FIG. 9 depicts a graph of experimental data where one character is dropped from the correct user ID and PW.

As shown, the highest mismatches are five, the lowest is zero. Thus, the number of mismatches among the bitstream (challenge/response) is very low. In contrast, FIG. 9 shows the number of mismatches among each run for the user's incorrect credentials. Only one character was dropped from the correct credentials, and then, the protocol was run 30 times. In each run, the number of mismatches was higher than approximately 30 mismatches. So, in this case, it would be appropriate for the server to note that the response with a high number of mismatches with the challenge must be considered a non-existing user, and the system must not authenticate that user.

After testing the number of flipped bits between the challenge and response for the correct user and incorrect user according to the median value, the fuzzy area was applied in the protocol. The fuzzy area will be close to the median value both up and down. The protocol did not choose from the resistance values in the fuzzy area. So, after the fuzzy area was applied and the resistance values far from the fuzzy area were selected, a clean bitstream was produced wherein most of the time, the challenge and response matched.

Second Experiment

There was another question to test: when giving a correct user ID/password and running the protocol 100 times, how many times would the protocol reject the user (i.e., false rejection)? This second experiment demonstrates the result of this question.

Figure 10:
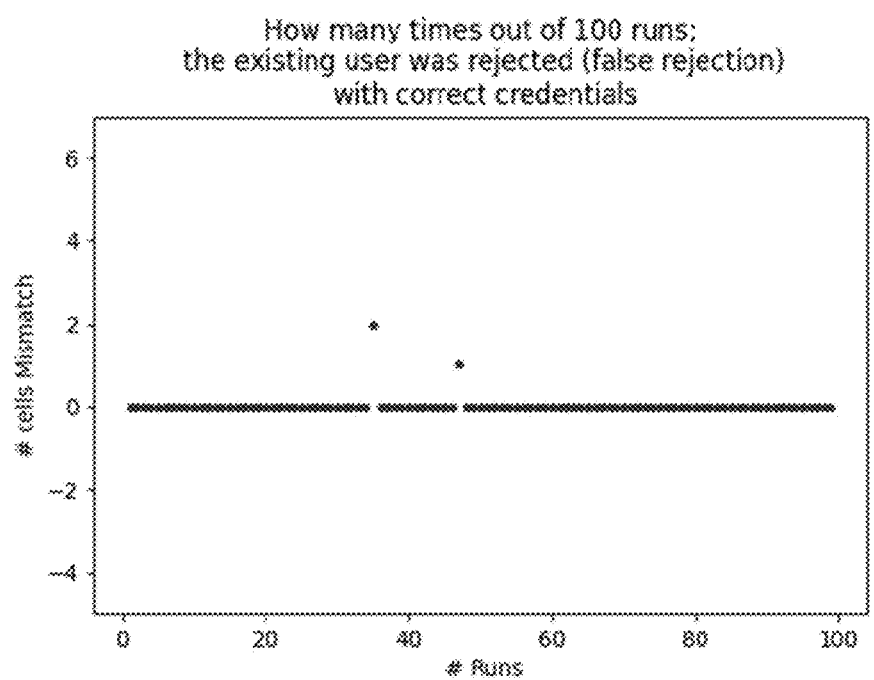
FIG. 10 depicts the results of an experiment demonstrating the utility of excluding erratic cells in the disclosed systems.

The same experiment was performed as the first experiment, except the fuzzy area was added and the resistance values outside of the fuzzy area were selected. The number of mismatches decreased to zero. Out of 100 runs, there were only two runs had a mismatch, and the number of mismatches was not higher than two (FIG. 10). Both times, the number of mismatches was minimal. Therefore, implementing the fuzzy area helps generate clean challenges and responses. However, there is still a meager chance that the actual user will be rejected. Therefore, it can be inferred that this novel method works based on a ReRAM PUF.

The described features, advantages, and characteristics may be combined in any suitable manner in one or more embodiments. One skilled in the relevant art will recognize that the method may be practiced without one or more of the specific features or advantages of a particular embodiment. In other instances, additional features and advantages may be recognized in certain embodiments that may not be present in all embodiments.

Reference throughout this specification to "one embodiment," "an embodiment," or similar language means that a particular feature, structure, or characteristic described in connection with the embodiment is included in at least one embodiment. Thus, appearances of the phrase "in one embodiment," "in an embodiment," and similar language throughout this specification may, but do not necessarily, all refer to the same embodiment.

The invention claimed is:

1. A method of authenticating users of a computing system, the method comprising:
    causing processing circuitry of the computing system to execute an enrollment process comprising the steps of:
        receiving first user credentials;
        generating a first message based on the the first user credentials and using the first message to identify devices in an array of physical unclonable function devices (a PUF array), wherein the PUF array is an array of ReRAM devices;
        supplying a probe current and measuring the resistance of the devices in the PUF array identified using the first message, resulting in a first array of resistance values;
        computing a first median resistance value from the resistance values in the first array;
        comparing each resistance value in the first array to the first median, and generating an enrollment bitstream on the basis of the comparison;
        storing the enrollment bitstream in an addressable database;
        receiving second user credentials;
        generating a second message based on the second user credentials and using the second message to identify devices in the PUF array;
        supplying the probe current and measuring the resistance of the devices in the PUF array identified using the second message, resulting in a second array of resistance values;
        computing a second median resistance value from the resistance values in the second array;
        comparing each resistance value in the second array to the second median, and generating an authentication bitstream on the basis of the comparison;
        comparing the enrollment and authentication bitstreams to determine whether a user is authentic.

2. The method of claim 1, wherein the first and second user credentials comprise a user ID or a password.

3. The method of claim 1, further comprising, after generating the first message on the basis of the first user credentials, deleting the first user credentials.

4. The method of claim 1, wherein generating a first message comprises applying a cryptographic hash to the first user credentials, and wherein generating a second message comprises applying the cryptographic hash to the second user credentials.

5. The method of claim 1, wherein the first user credentials comprise a first user ID and a first password, and wherein the first user ID and the first password are combined to generate the first message, and wherein the second user credentials comprise a second user ID and a second password, and wherein the second user ID and the second password are combined to generate the second message.

6. The method of claim 5, wherein the first user ID and the first password are combined by an XOR process, and wherein the second user ID and the second password are combined by an XOR process.

7. The method of claim 1, further comprising, after computing the first median resistance value from the resistance values in the first array, identifying devices in the PUF array identified using the first message for which the measured resistance is within a predetermined range centered on the first median resistance value.

8. The method of claim 7, further comprising generating an enrollment mask bitstream that may be applied to the enrollment bitstream to blank bits corresponding to the devices in the first PUF array identified using the first message for which the measured resistance is within a predetermined range centered on the first median resistance value and applying the enrollment mask bitstream prior to comparison between the enrollment bitstream and the authentication bitstream.

9. The method of claim 8 further comprising, after computing the second median resistance value from the resistance values in the second array, identifying devices in the PUF array identified using the second message for which the measured resistance is within a predetermined range centered on the second median resistance value.

10. The method of claim 9, further comprising generating an authentication mask bitstream that may be applied to the authentication bitstream to blank bits corresponding to the devices in the PUF array identified using the second message for which the measured resistance is within a predetermined range centered on the second median resistance value, and applying the authentication mask bitstream prior to comparison between the enrollment bitstream and the authentication bitstream.

11. The method of claim 1, wherein comparing the enrollment and authentication bitstreams to determine whether a user is authentic comprises determining whether the enrollment and authentication bitstreams match to within a predetermined degree, and further comprising the step of, if the enrollment and authentication bitstreams match to within a predetermined degree, authenticating the user and permitting communication between the computing device and the user.

12. A method of authenticating users of a computing system, the method comprising:
  causing processing circuitry of the computing system to execute an enrollment process comprising the steps of:
  receiving a first user ID and a first password;
  generating a first message based on the the first user ID and using the first message to identify devices in an array of physical unclonable function devices (a PUF array), wherein the PUF array is an array of ReRAM devices;
  supplying a probe current and measuring the resistance of the devices in the first PUF array identified using the first message, resulting in a first array of resistance values;
  computing a first median resistance value from the resistance values in the first array;
  comparing each resistance value in the first array to the first median, and generating a first enrollment bitstream on the basis of the comparison;
  and storing the first enrollment bitstream in an addressable database;
  generating a second message based on the first password and using the second message to identify devices in the PUF array;
  supplying a probe current and measuring the resistance of the devices in the PUF array identified using the second message, resulting in a second array of resistance values;
  computing a second median resistance value from the resistance values in the second array;
  comparing each resistance value in the second array to the second median, and generating a second enrollment bitstream on the basis of the comparison;
  and storing the second enrollment bitstream in an addressable database;
  receiving second user ID and a second password;
  generating a third message based on the second user ID and using the second message to identify devices in the PUF array;
  generating a third message based on the second user ID and using the third message to identify devices in the PUF array;
  supplying a probe current and measuring the resistance of the devices in the PUF array identified using the third message, resulting in a third array of resistance values;
  computing a third median resistance value from the resistance values in the third array;
  comparing each resistance value in the third array to the third median, and generating a first authentication bitstream on the basis of the comparison;
  and storing the first authentication bitstream in an addressable database;
  generating a fourth message based on the second password and using the fourth message to identify devices in the PUF array;
  supplying a probe current and measuring the resistance of the devices in the PUF array identified using the fourth message, resulting in a fourth array of resistance values;
  computing a fourth median resistance value from the resistance values in the fourth array;
  comparing each resistance value in the fourth array to the fourth median, and generating a second authentication bitstream on the basis of the comparison;
  comparing the first enrollment bitstream to the first authentication bitstream and the second enrollment bitstream to the second authentication bitstream to determine whether a user is authentic.

13. The method of claim 12, further comprising, after receiving the first user ID and the first password, deleting the first user ID and the first password.

14. The method of claim 12, further comprising excluding from the first enrollment bitstream bits corresponding to devices having a measured resistance within a predetermined range of the first median, excluding from the second enrollment bitstream bits corresponding to devices having a measured resistance within a predetermined range of the second median, excluding from the first authentication bitstream bits corresponding to devices having a measured resistance within a predetermined range of the third median, and excluding from the second enrollment bitstream bits corresponding to devices having a measured resistance within a predetermined range of the fourth median.

15. A method of authenticating users of a computing system with temporary access credentials, the method comprising:
  causing processing circuitry of the computing system to execute a process comprising the steps of:
  receiving a first user identifier from a user;
  generating a random number;
  generating a first message based on the random number and using the first message to identify devices in an array of physical unclonable function devices (a PUF array), wherein the PUF array is an array of ReRAM devices;
  supplying a probe current and measuring the resistance of the devices in the PUF array identified using the first message, resulting in a first array of resistance values;
  computing a first median resistance value from the first array of resistance values;
  comparing each resistance value in the first array of resistance values to the first median resistance value, and generating a first temporary password bitstream on the basis of the comparison;
  sending the first temporary password bitstream to the user;
  storing the random number in a database in association with the first user identifier and timing information relating to the time the random number was generated or sent to the user;
  receiving a user bitstream and a user identifier from a user;
  retrieving the random number from the database on the basis of the user identifier;
  analyzing the timing information to determine whether the random number is expired;
  if the random number is not expired, generating a second message identify devices in the PUF array;

supplying a probe current and measuring the resistance of the devices in the PUF array identified using the second message, resulting in a second array of resistance values;

computing a second median resistance value from the second array of resistance;

comparing each resistance value in the second array of resistance values to the second median, and generating an authentication bitstream on the basis of the comparison;

comparing the user bitstream and the authentication bitstream to determine whether a user is authentic.

16. The method of claim 15, further including deleting the temporary password bitstream after it is sent to the user.

17. The method of claim 15, wherein determining whether the random number expired comprises comparing the timing information with information relating to the time the system receives the temporary password bitstream from the user.

18. The method of claim 15, wherein the random number is hashed to generate the first message.

19. The method of claim 15, wherein the first user identifier and the random number are subject to an XOR process and the resulting number is hashed to generate the first message.

20. The method of claim 15, further comprising excluding from the first temporary password bitstream bits corresponding to devices having a measured resistance within a predetermined range of the first median, and excluding from the authentication bitstream bits corresponding to devices having a measured resistance within a predetermined range of the second median prior to comparison between the second temporary password bitstream and the authentication bitstream.

* * * * *